(12) United States Patent
Osborn et al.

(10) Patent No.: US 12,348,637 B2
(45) Date of Patent: Jul. 1, 2025

(54) USING VIRTUAL OBJECTS ON DIFFERENT PLATFORMS

(71) Applicant: Capital One Services, LLC, McLean, VA (US)

(72) Inventors: Kevin Osborn, Newton Highlands, MA (US); Imren Johar, Clifton, VA (US); Dennis Sean Brennan, Pleasanton, CA (US)

(73) Assignee: Capital One Services, LLC, McLean, VA (US)

( * ) Notice: Subject to any disclaimer, the term of this patent is extended or adjusted under 35 U.S.C. 154(b) by 283 days.

(21) Appl. No.: 18/064,327

(22) Filed: Dec. 12, 2022

(65) Prior Publication Data

US 2024/0195623 A1    Jun. 13, 2024

(51) Int. Cl.
*H04L 9/32*    (2006.01)

(52) U.S. Cl.
CPC .......... *H04L 9/3213* (2013.01); *H04L 9/3247* (2013.01)

(58) Field of Classification Search
CPC ............................ H04L 9/3213; H04L 9/3247
See application file for complete search history.

(56) References Cited

U.S. PATENT DOCUMENTS

| | | | |
|---|---|---|---|
| 12,164,537 B1* | 12/2024 | James Lewis | G06F 16/252 |
| 2021/0105142 A1* | 4/2021 | Lee | H04L 9/3247 |
| 2022/0292588 A1* | 9/2022 | Collen | G06Q 20/38215 |
| 2023/0129494 A1* | 4/2023 | Quigley | G06Q 20/123 705/65 |
| 2023/0325896 A1* | 10/2023 | Luker | G06Q 30/0643 705/26.1 |
| 2023/0353570 A1* | 11/2023 | Lee | H04L 63/10 |
| 2024/0062190 A1* | 2/2024 | Rymer | G06Q 20/409 |
| 2024/0152905 A1* | 5/2024 | Franco | G06Q 30/018 |

* cited by examiner

*Primary Examiner* — Carl G Colin
*Assistant Examiner* — Phillip Emmanuel Wilson
(74) *Attorney, Agent, or Firm* — Foley & Lardner LLP

(57) ABSTRACT

Methods and systems are described herein for using cryptographic tokens that represent real-world items to enable those items to be used in different virtual worlds (e.g., game worlds). In particular, an object retrieval system may be used to retrieve a cryptographic token that encodes parameter data for an object to be used (e.g., displayed) within a plurality of computing platforms. The object retrieval system may determine (e.g., using a cryptographic signature) that the user is allowed to use the object and may then generate a set of parameters for representing the object with the particular computing platform requesting the object. The object retrieval system may then transmit the parameters to the requesting platform. The object retrieval system may perform the same operations for requests from other platforms, such that the object retrieval system may uniquely encode the parameters for the particular platforms.

20 Claims, 7 Drawing Sheets

USING VIRTUAL OBJECTS ON DIFFERENT PLATFORMS

BACKGROUND

Recently, when people acquire items (e.g., sneakers, hats, etc.), certain entities have started rewarding those people with non-fungible tokens (NFTs) that represent the acquired items. Generally, the people who possess those NFTs may only view those NFTs on their computing devices but are unable to do much else with them. In addition, in recent years, platform developers and game developers have been enabling users to bring outside items into virtual worlds or game worlds. For example, when users connect to virtual platforms using Virtual Reality Headsets and Augmented Reality Headsets, items from the real world may now be visible in the virtual world. Accordingly, it would be advantageous to enable users to bring acquired items (represented by NFTs) into virtual environments (e.g., video game environments, virtual worlds, etc.).

SUMMARY

One mechanism for bringing items from an outside world into a game world or another virtual world may be using blockchain technology, in particular, cryptographic tokens (e.g., non-fungible tokens that were received by users when those users acquired the items). Therefore, methods and systems are described herein for using cryptographic tokens that represent real-world items to enable those items to be used in different virtual environments (e.g., game worlds). In particular, an object retrieval system may be used to retrieve a cryptographic token that encodes parameter data for an object to be used (e.g., displayed) within a plurality of computing platforms. The object retrieval system may determine (e.g., using a cryptographic signature) that the user is allowed to use the object and may then generate a set of parameters for representing the object within the particular computing platform (e.g., virtual world) requesting the object. The set of parameters may be unique for the requesting platform. The object retrieval system may then transmit the parameters to the requesting platform. The object retrieval system may then receive similar requests from other platforms and may retrieve and uniquely encode parameters representing the object for those other requesting platforms, thereby, enabling the object to be used within many virtual platforms.

The object retrieval system may perform the following operations when performing object retrieval (e.g., parameter retrieval for an object) for multiple computing platforms. The object retrieval system may receive, from a computing platform of a plurality of computing platforms, a retrieval request for object parameters of an object to be rendered for a user within the computing platform. For example, a user may have acquired a particular pair of sneakers. When acquiring the sneakers, the user may have received control of a cryptographic token (e.g., a non-fungible token) representing the sneakers. The cryptographic token may store different characteristics associated with the sneakers (e.g., different characteristics for rendering the sneakers). Those characteristics may include shape, color, etc.

Before the cryptographic token is used, the cryptographic token may be generated and committed to a blockchain using a blockchain node. The object retrieval system may receive a token generation request to generate the cryptographic token. The token generation request may include a plurality of object parameters and the application identifier of the cryptography-based storage application. For example, the object parameters may be characteristics of the acquired sneakers (e.g., color, shape, texture, etc.), and the cryptography-based storage application may be associated with the user that acquired the sneakers.

The object retrieval system may encrypt the plurality of object parameters using a public key associated with the cryptography-based storage application into an encrypted plurality of object parameters. For example, the client device may have registered with the object retrieval system and a private key, and a public key may have been assigned to the cryptography-based storage application residing on the client device. The object retrieval system may retrieve the public key and encrypt the data using the public key. The object retrieval system may then generate the cryptographic token to be controlled by the cryptography-based storage application such that the cryptographic token stores the encrypted plurality of object parameters.

Based on the request, the object retrieval system may retrieve, from a blockchain node, a cryptographic token representing the object on the blockchain. In particular, the object retrieval system may retrieve, based on data within the retrieval request, a cryptographic token associated with the object. For example, the object may be a pair of sneakers acquired by a user for which the user was given control of an NFT. Thus, the object retrieval system may retrieve the NFT from the blockchain. The NFT may include characteristics associated with the object the NFT represents.

When the NFT is retrieved, the object retrieval system may determine whether the user requesting usage of the object controls the NFT. In particular, the object retrieval system may determine that a cryptography-based storage application associated with the user controls the cryptographic token. For example, when the NFT was created during the process when the user acquired the corresponding object, that NFT may have been assigned to be controlled by a particular cryptography-based storage application (e.g., a cryptography-based storage application of the acquiring user). Thus, the object retrieval system may determine whether the requesting user controls the NFT by, for example, requesting a cryptographic signature from a cryptography-based storage application that controls the NFT.

When the user has been verified, the object retrieval system may use the data within the cryptographic token to generate parameters based on the characteristics of the object for the requesting platform. In particular, the object retrieval system may determine, based on token data within the cryptographic token, a set of platform parameters corresponding to the computing platform of the plurality of computing platforms. The set of platform parameters may be unique to the computing platform. For example, the NFT may store characteristics of a pair of sneakers that may be displayed within the requesting computing platform. In addition, the NFT may store or may include a link to specific platform parameters that may be needed by the platform to render or use the object. For example, the NFT may include a link to a template associated with a particular platform. The object retrieval system may use the link to retrieve the template and insert object characteristics into the template, creating a set of platform parameters.

In some embodiments, the contents of the NFT may be encrypted and may only be decrypted by a private key associated with the cryptography-based application of the user (e.g., the cryptography-based application to which the NFT was assigned). Thus, the object retrieval system may retrieve, using the cryptographic token, a plurality of encrypted object parameters associated with the object encoded by the cryptographic token and transmit a command to a client device associated with the cryptography-based storage application to decrypt the plurality of encrypted object parameters. In response to the command, the client device may decrypt the encrypted parameters and transmit them to the object retrieval system. The object retrieval system may receive object parameters from the client device and encode the object parameters into the first set of platform parameters for the first computing platform.

The object retrieval system may then transmit the set of platform parameters to the computing platform. For example, the template may include a particular format for the platform to render or otherwise use the pair of sneakers. Thus, the template may include fields for color, shape, texture, etc. so that when the computing platform retrieves the filled-in template, the platform is able to render the pair of sneakers. When another platform makes a request for the same object, the object retrieval system may determine platform parameters for the other platform (e.g., retrieve a template for that platform) and insert the characteristics of the object from the NFT into the template.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
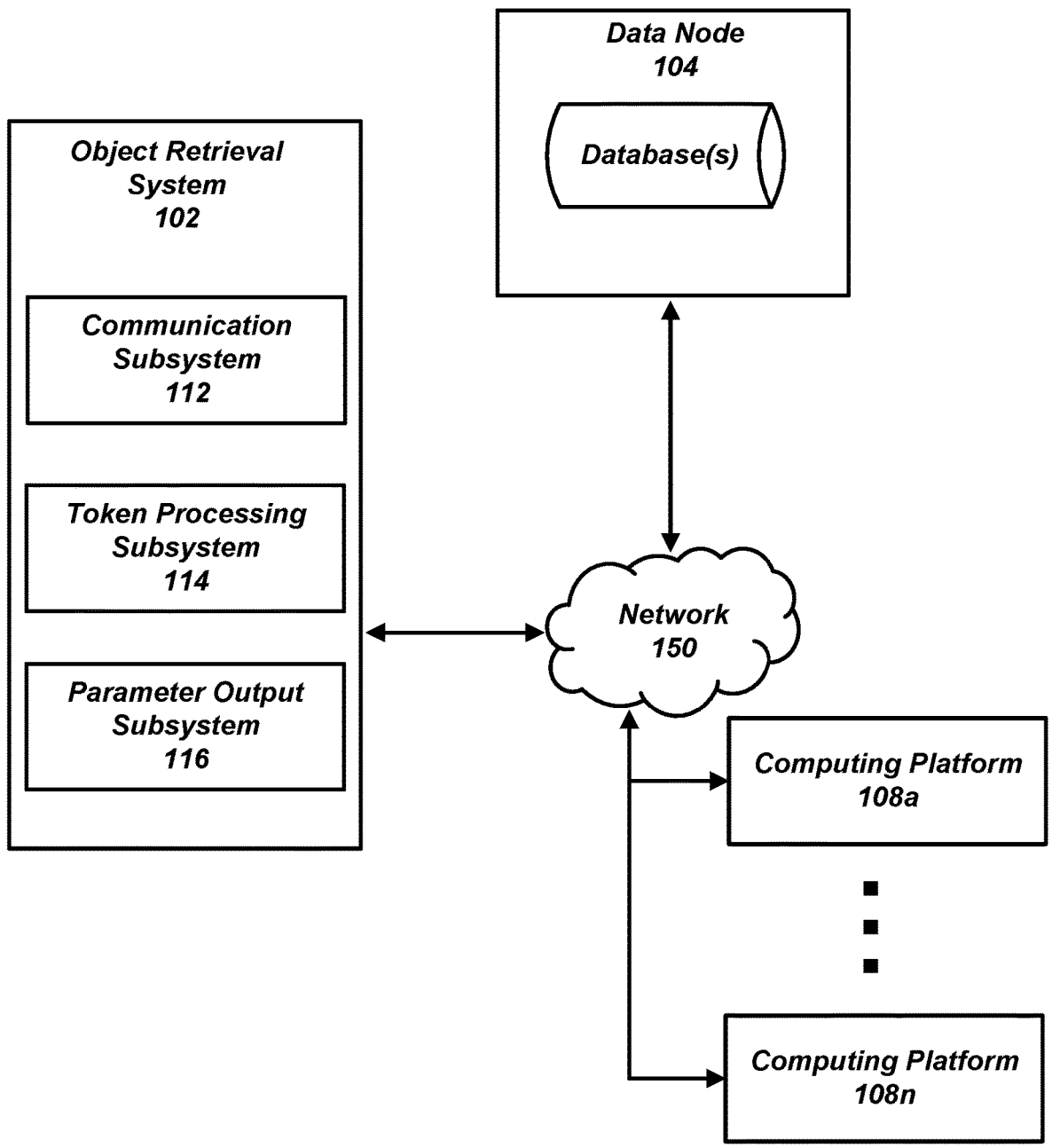
FIG. 1 shows an illustrative system for using cryptographic tokens to use items on multiple computing platforms, in accordance with one or more embodiments of this disclosure.

FIG. 1 is an example of environment 100 for using cryptographic tokens to bring virtual representations of real-world items to multiple computing platforms. Environment 100 includes object retrieval system 102, data node 104, and computing platforms 108a-108n. Object retrieval system 102 may execute instructions for using cryptographic tokens to bring virtual representations of real-world items to multiple computing platforms. Object retrieval system 102 may include software, hardware, or a combination of the two. For example, object retrieval system 102 may be hosted on a physical server or a virtual server that is running on a physical computer system. In some embodiments, object retrieval system 102 may be configured on a user device (e.g., a laptop computer, a smartphone, a desktop computer, an electronic tablet, or another suitable user device). In some embodiments, object retrieval system 102 may be hosted on a blockchain and may execute operations on a blockchain node. For example, object retrieval system 102 may be a smart contract or another on-chain program that is being executed by a blockchain node. In some embodiments, object retrieval system 102 may be hosted on an independent computing device and may send requests to the blockchain node to execute instructions (e.g., retrieve cryptographic tokens, mint cryptographic tokens, etc.).

Computing platforms 108a-108n may be platforms used by a particular user. For example, a user may use a multi-player gaming platform such that representations of objects acquired in the real world may be used in the gaming world. In another example, one of the platforms may be the Metaverse, where representations of objects may be used (e.g., sneakers, hats, cars, etc.). Other types of computing platforms may be used with the disclosed access control system. Data node 104 may store various data, including user data (e.g., registration data for user/client devices), function data for each service available within the object retrieval system 102, and/or other suitable data. Data node 104 may include software, hardware, or a combination of the two. For example, data node 104 may be a physical server, or a virtual server that is running on a physical computer system. In some embodiments, object retrieval system 102 and data node 104 may reside on the same hardware and/or the same virtual server/computing device. Network 150 may be a local area network, a wide area network (e.g., the Internet), or a combination of the two.

Object retrieval system 102 may receive, from a computing platform of a plurality of computing platforms (e.g., a computing platform of computing platforms 108a-108n), a retrieval request for object parameters of an object to be rendered for a user within the computing platform. In some embodiments, object retrieval system 102 may receive the retrieval request using communication subsystem 112. Communication subsystem 112 may include software components, hardware components, or a combination of both. For example, communication subsystem 112 may include a network card (e.g., a wireless network card and/or a wired network card) that is associated with software to drive the card. The retrieval request may include a number of items. In some embodiments, the retrieval request may include a token identifier of a cryptographic token that encodes parameter data for an object to be displayed within each of a plurality of computing platforms. A cryptographic token may be a data structure hosted on a blockchain. The cryptographic token may be assigned to be controlled by a cryptography-based storage application (e.g., a cryptographic wallet) at the time of creation. For example, when a user acquires a real-world item the distributor of the item may use the system to generate an NFT representing the item and commit the NFT to the blockchain (e.g., mint the NFT on the blockchain). The NFT may be assigned to be controlled by a cryptography-based application associated with the user that acquired the item. Some examples of cryptographic tokens include non-fungible tokens (NFTs) and fungible tokens. Non-fungible tokens may be tokens generated based on the ERC-721 standard.

In some embodiments, the retrieval request may include an application identifier of a cryptography-based storage application. The cryptography-based application may be a cryptography-based application associated with the user and the retrieval request may indicate that the cryptography-based application controls the cryptographic token. A cryptography-based storage application is sometimes referred to as a cryptographic wallet. The cryptography-based storage application may store a private key associated with a corresponding user and may include software, hardware, or a combination of the two. For example, each cryptography-based storage application may include software executed on one or multiple devices or may include hardware such as a physical device. In some cases, the cryptography-based storage application may be software and may be stored in data nodes and a user of the cryptography-based storage application may access the cryptography-based storage application online, e.g., via a browser. Alternatively or additionally, the cryptography-based storage application may reside on a general-purpose computer or on a special device (e.g., a fob) intended for storing the cryptography-based storage application. For example, the device may store private keys in the memory of the device and allow transactions to be completed on the device itself. Examples of cryptography-based storage applications may include cryptographic wallets. Devices may include any suitable end-user computing devices (e.g., desktop computers, laptops, electronic tablets, smartphones, and/or other computing devices used by end users) capable of transmitting and receiving data such as requests and/or like transactions.

Figure 2:
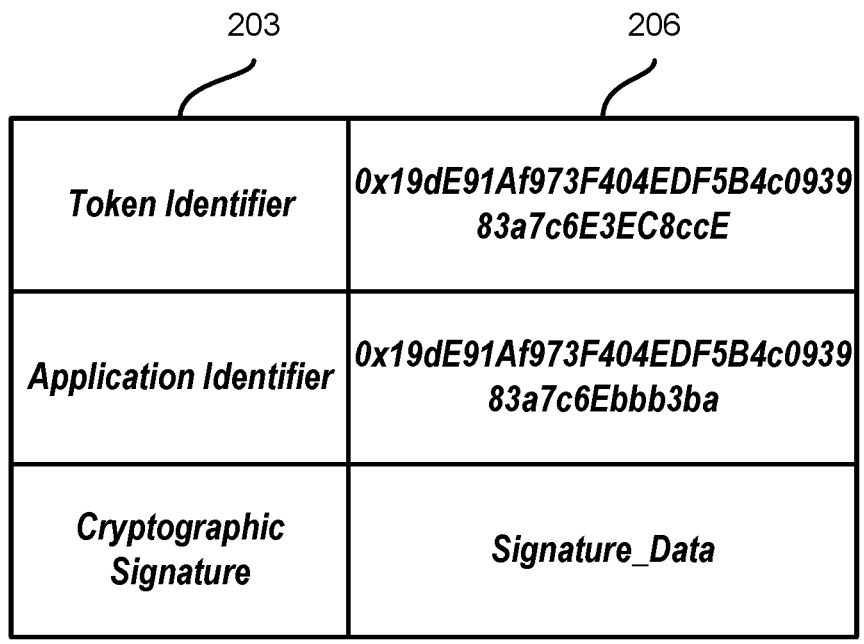
FIG. 2 illustrates a portion of a data structure for a retrieval request, in accordance with one or more embodiments of this disclosure.

The retrieval request may also include a cryptographic signature generated by the cryptography-based storage application. The cryptographic signature may be used to verify that the retrieval request originated from a device controlling the cryptography-based storage application. FIG. 2 illustrates a portion of data structure 200 for a retrieval request. The retrieval request may include field names 203 and field values 206. Field names 203 may include a token identifier field storing an identifier (sometimes referred to as an address) of the cryptographic token, an application identifier, and the cryptographic signature. The token identifier may identify a token that encodes parameter data for an object to be displayed or otherwise rendered or used within each of a plurality of computing platforms. That is, the cryptographic token may be a virtual representation of a real-world object. The token identifier may be used to retrieve the cryptographic token from the blockchain (e.g., using a blockchain node). The application identifier may be an identifier (sometimes referred to as an address) of a cryptography-based storage application that is being used in the request. Because the application identifier is in the retrieval request, the retrieval request purports that the associated cryptography-based storage application controls the cryptographic token. Object retrieval system 102 may perform a verification of whether the cryptography-based storage application associated with the application identifier actually controls the cryptographic token. This verification is sometimes referred to as whether a crypto wallet owns the cryptographic token. Thus, the cryptography-based storage application that controls the cryptographic token is able to transfer that cryptographic token to be controlled by another cryptography-based storage application. As discussed above, the cryptographic signature may be used in verifying the cryptography-based storage application requesting the virtual item to be rendered within the computing platform.

When the retrieval request is received, communication subsystem 112 may pass at least a portion of the data included within the retrieval request, or a pointer to the data in memory, to token processing subsystem 114. Token processing subsystem 114 may include software components, hardware components, or a combination of both. For example, token processing subsystem 114 may include software components that access and/or execute programs such as on-chain programs that use and/or generate cryptographic tokens (e.g., NFTs). Token processing subsystem 114 may retrieve, based on data within the retrieval request, a cryptographic token associated with the object. For example, token processing subsystem 114 may transmit a blockchain operation request to a blockchain node to retrieve data associated with the cryptographic token. The blockchain operation request may include the identifier of the cryptographic token. The blockchain operation request may be formatted based on a format supported by the blockchain node. The blockchain node may retrieve the data associated with the cryptographic token and transmit the data back. Token processing subsystem 114 may receive the data associated with the cryptographic token.

Figure 3:
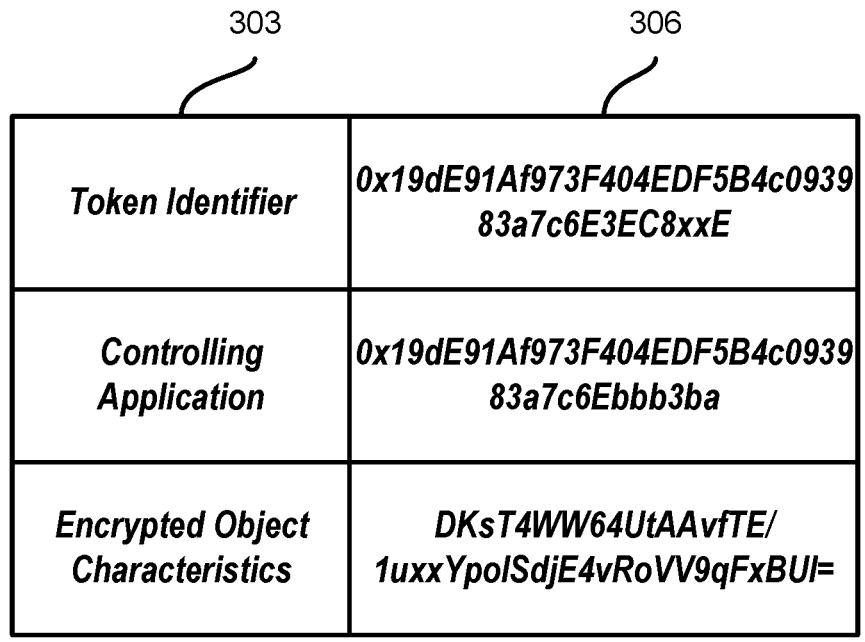
FIG. 3 illustrates a portion of a data structure representing a cryptographic token, in accordance with one or more embodiments of this disclosure.

FIG. 3 illustrates a portion of a data structure 300 representing a cryptographic token. Token field names 303 may represent field names for a token, while token field values 306 may include values for those fields. For example, token field names 303 may include a field for a token identifier that may uniquely identify the cryptographic token on the blockchain. Token identifiers are sometimes referred to as token addresses. Another field may be a controlling application which may identify a cryptography-based storage application that owns (e.g., controls) the cryptographic token. For example, the controlling application may be a string of 32 alphanumeric characters and may identify what is sometimes referred to as a cryptographic wallet. Some examples of hardware cryptographic wallets include Ledger®, and Trezor®. Software cryptographic wallets may include MetaMask® and others. Furthermore, an encrypted object characteristics field may be included in token field names 303. This field may store encrypted characteristics (e.g., type, color, shape, etc.) associated with the object represented by the cryptographic token.

The cryptographic token may include other fields such as a uniform resource identifier (URI) which may be a link for other information (e.g., metadata) associated with the cryptographic token. For example, the URI may link to a database server (e.g., such as data node 104). In some embodiments, the information may include logging data for various retrieval requests from various platforms and whether those requests have been successful. For example, object retrieval system 102 may extract particular data from each retrieval request (e.g., computing platform that identifies the computing platform, time of the request, etc.). In addition, object retrieval system 102 may determine whether the request is successful (e.g., whether the cryptographic-based storage application controls the cryptographic token) as will be described below.

Those encrypted instructions may have been added to the cryptographic token during generation of the cryptographic token or an update of the cryptographic token (e.g., transfer of the cryptographic token to be controlled by another cryptography-based storage application). For example, when a user acquires the item whether from a merchant or from another user, the user may give the merchant or the other user an identifier of a cryptography-based storage application (e.g., a crypto wallet address) associated with the user. The merchant may then cause the cryptographic token to be generated to be controlled by that cryptography-based storage application.

The cryptographic token may have been generated using the following operations. Token processing subsystem 114 may receive a token generation request to generate the cryptographic token. The token generation request may include a plurality of object parameters and an application identifier of the cryptography-based storage application. For example, when a user acquires a pair of sneakers from a merchant, the merchant may receive an identifier (e.g., an address) of a cryptography-based storage application. A computing system associated with a merchant may then create a token generation request. The token generation request may include the identifier of the cryptography-based storage application and various characteristics of the object (e.g., shape, size, color, type, etc.). Token processing subsystem 114 may receive the token generation request (e.g., via communication subsystem 112).

Token processing subsystem 114 may encrypt the plurality of object parameters using a public key associated with the cryptography-based storage application into an encrypted plurality of object parameters. For example, token processing subsystem 114 may retrieve a public key associated with the cryptography-based storage application. In some embodiments, the public key may have been received from a user device when the user registered with object retrieval system 102. In some embodiments, the address of the cryptography-based storage application may also be the public key. Thus, in some embodiments, data encrypted with a public key of the cryptography-based storage application may only be decrypted with a corresponding private key (e.g., a private key residing on a client device of the user that hosts the cryptography-based storage application). Accordingly, only a user's private key will be able to decrypt this encrypted data.

Token processing subsystem 114 may then generate the cryptographic token to be controlled by the cryptography-based storage application. The cryptographic token may store the encrypted plurality of object parameters. For example, token processing subsystem 114 may generate a blockchain operation request to a blockchain node of a blockchain. The blockchain operation request may instruct the blockchain node to mint (e.g., commit) a cryptography token (e.g., an NFT) representing an item to the blockchain. The blockchain operation request may include a payload of the encrypted plurality of object parameters (e.g., characteristics of the item). In some embodiments, the encrypted object parameters may be stored outside of the cryptographic token. For example, token processing subsystem 114 may generate a URI (e.g., a link to a database on data node 104 or another suitable data node) that enables retrieval of the encrypted object parameters. Thus, the URI will be stored as part of the cryptographic token while the encrypted data may be stored on a server. This way, object retrieval system 102 never loses control of the data (e.g., the data may be erased or caused to be inaccessible at any time).

As discussed above, when the cryptographic token is created and committed to the blockchain it may be used by object retrieval system 102 to cause a virtual object representing an item to be rendered on different computing platforms. However, only a key (e.g., a private key) associated with the cryptography-based storage application of the user is able to decrypt the encrypted parameters (e.g., characteristics) within the cryptographic token. Returning back to FIG. 1, token processing subsystem 114 may determine that a cryptography-based storage application associated with the user (e.g., a user requesting usage of the virtual item) controls the cryptographic token. In particular, token processing subsystem 114 may determine that the identifier (e.g., an address) associated with the cryptography-based storage application requesting usage of the virtual item matches the owner of the cryptographic token (as indicated by the data within the cryptographic token) and the user is in fact in control of the cryptography-based storage application based on the cryptographic signature.

For example, token processing subsystem 114 may perform the following operations to determine that the cryptography-based storage application associated with the user controls the cryptographic token. Token processing subsystem 114 may determine that the application identifier matches a control identifier stored in association with the cryptographic token. For example, the cryptographic token may store a control identifier corresponding to an identifier of a cryptography-based storage application that controls the cryptographic token. An example of a control identifier is a controlling application field of FIG. 3. Thus, token processing subsystem 114 may compare the control identifier within the cryptographic token with an identifier of the cryptography-based application associated with the requesting user (e.g., the user requesting usage of the virtual item).

In addition to matching identifiers, token processing subsystem 114 may determine, using the first cryptographic signature and the token identifier, that the cryptography-based storage application controls the cryptographic signature. In particular, token processing subsystem 114 may verify the cryptographic signature by successfully decrypting a payload within the cryptographic signature using a public key associated with the cryptography-based storage application. For example, to generate the cryptographic signature, the cryptography-based storage application may have used the associated private key. As the private key is secure, only one cryptography-based storage application may have been used to encrypt the data (e.g., a nonce) within the signature. Accordingly, if token processing subsystem 114 is able to decrypt the encrypted data within the cryptographic signature using the public key corresponding to the cryptography-based storage application that controls the cryptographic token and the data (e.g., the decrypted nonce) and match the unencrypted data (e.g., the nonce) within the cryptographic signature, token processing subsystem 114 may determine that the requesting cryptography-based storage application controls the cryptographic token. Thus, based on successful match and successful verification, token processing subsystem 114 may determine that the cryptography-based storage application controls the cryptographic token.

Figure 4:
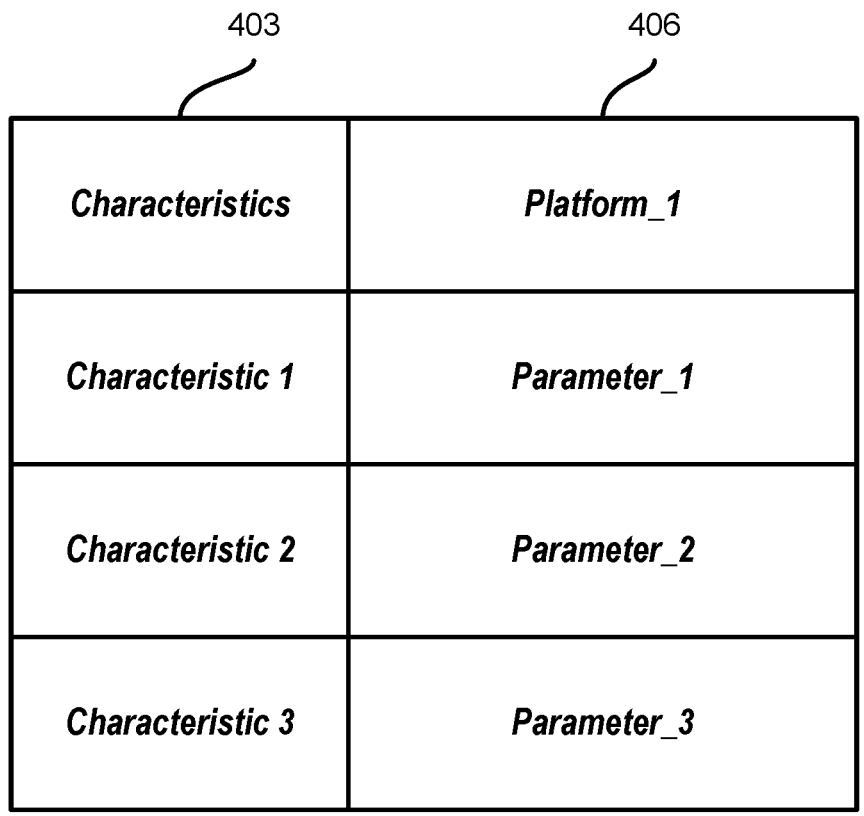
FIG. 4 illustrates a map representing different parameters of a particular computing platform and corresponding characteristics of an object, in accordance with one or more embodiments of this disclosure.

When the requesting cryptography-storage application is verified, token processing subsystem 114 may pass an indication of verification (e.g., a verification successful flag) to parameter output subsystem 116. Parameter output subsystem 116 may include software components, hardware components, or a combination of both. For example, parameter output subsystem 116 may include software components that access and/or execute programs using hardware. Parameter output subsystem 116 may determine, based on token data within the cryptographic token, a set of platform parameters corresponding to the computing platform of the plurality of computing platforms. The set of platform parameters may be unique to the computing platform. The set of platform parameters may be used by the computing platform to render the object on the computing platform. For example, parameter output subsystem 116 may retrieve a mapping between characteristics of an object as stored within the cryptographic token and parameters of a particular platform. The parameter map may be unique for each computing platform and may be stored within the cryptographic token. In some embodiments, each parameter map may be stored on a remote device (e.g., data node 104) and may be linked to from the cryptographic token using a URI or another link stored within the cryptographic token. For example, there may be a URI or link within the token for each supported platform. FIG. 4 illustrates a map 400 representing different parameters of a particular computing platform and corresponding characteristics of an object. Fields 403 represent different characteristics of an object (e.g., an item to be rendered within the platform) and fields 406 may represent different platform parameters corresponding to the characteristics.

In some embodiments, the mappings may be generated when a particular object type is registered with the object retrieval system and each platform has synchronized the object to be rendered. For example, if a new pair of sneakers is created by a manufacturer the manufacturer may transmit to object retrieval system 102 characteristics for the sneakers and other metadata (e.g., possible colors, shapes, etc.). Object retrieval system 102 may request that each registered platform map the characteristics and generate and submit a map for using the new object type.

In some embodiments, to determine the set of platform parameters, parameter output subsystem 116 may cause the encrypted parameters with the cryptographic token to be decrypted. As the decryption must be performed using a private key of the associated cryptography-based storage application, parameter output subsystem 116 may perform the following operations to cause the decryption operation. Parameter output subsystem 116 may retrieve, using the cryptographic token, a plurality of encrypted object parameters associated with the object encoded by the cryptographic token. For example, parameter output subsystem 116 may extract a payload that includes the encrypted object parameters (e.g., characteristics of an object such as a pair of sneakers, a hat, etc.) from the cryptographic token data received from the blockchain node, as discussed above. Parameter output subsystem 116 may then transmit (e.g., via communication subsystem 112) a command to a client device associated with the cryptography-based storage application to decrypt the plurality of encrypted object parameters. For example, parameter output subsystem 116 may retrieve an identifier of the client device and transmit the encrypted object parameters to the client device with the decryption command.

In response to the command, parameter output subsystem 116 may receive (e.g., via communication subsystem 112) the object parameters from the client device. That is, the client device may use a private key stored within the cryptography-based storage application to decrypt the encrypted object parameters and transmit those parameters to object retrieval system 102. Object retrieval system 102 may receive (e.g., via communication subsystem 112) the decrypted object parameters and pass those object parameters to parameter output subsystem 116. Parameter output subsystem 116 may then encode the object parameters into the set of platform parameters for the computing platform.

Figure 5:
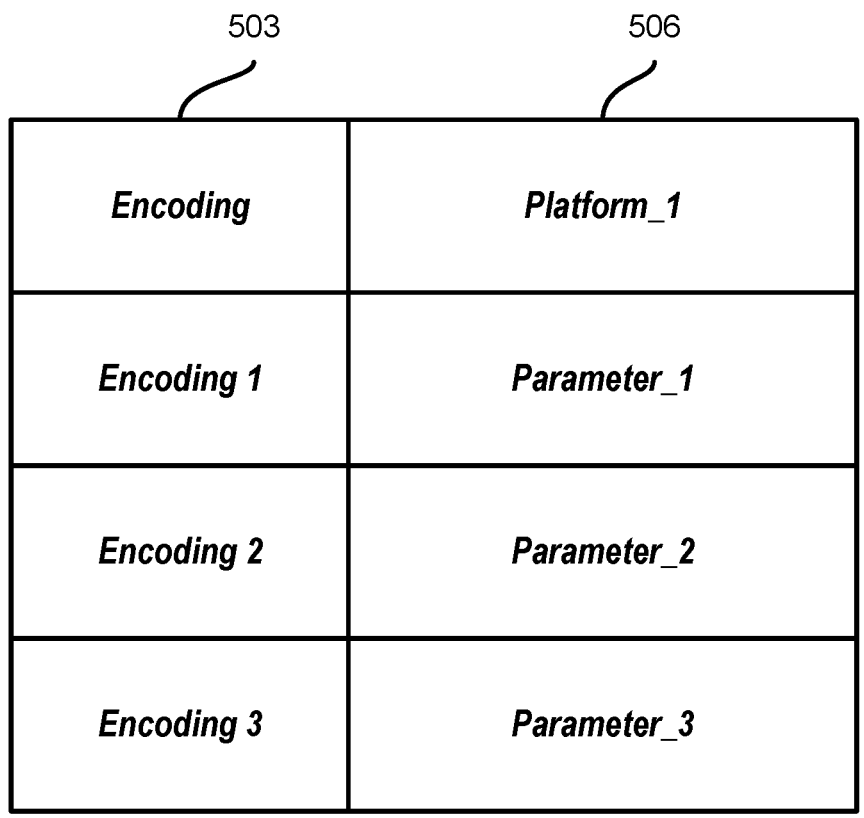
FIG. 5 illustrates a data structure representing a template, in accordance with one or more embodiments of this disclosure.

The encoding operation may encode the object parameters (e.g., the characteristics of an object to be rendered within the platform) based on the computing platform's formatting requirements so that the particular platform is able to render the object or otherwise display/use the object within the platform. Each computing platform may have its own set of requirements which may be encoded in a template. FIG. 5 illustrates a data structure 500 representing a template, in accordance with one or more embodiments of this disclosure. Template 500 may include a plurality of encoding and matching parameters. Fields 503 may store encoding and fields 506 may store corresponding parameters. Thus, each parameter may be encoded into a format/language that the particular computing platform may understand. For example, for a pair of sneakers, a first parameter may be a shape of the sneakers. Thus, encoding 1 may include a field name "shape" or another suitable name. In some embodiments, the encoding format/language may be similar to XML type of formatting. Thus, every parameter may have a corresponding tag. One example of a tag may be <type> sneakers </type>. Another example may be <color> blue </color>. Other encoding schemes/formats/languages may be used. In addition, different platforms may use different encoding schemes. However, parameter output subsystem 116 may use the template to correctly generate the encoding.

In some embodiments, parameter output subsystem 116 may perform the following operations when using templates. Parameter output subsystem 116 may retrieve a format template associated with the computing platform. The format template may be stored within the cryptographic token. In some embodiments, the format template may be stored outside the cryptographic token. Parameter output subsystem 116 may then encode the object parameters into the set of platform parameters according to the format template. For example, parameter output subsystem 116 may use the encoding data in fields 503 of FIG. 5 for each parameter to generate the encoding for each parameter.

As discussed above, each template for each computing system that supports object retrieval system 102 may be stored outside of the token. However, a token may have a link (e.g., a URI) to the location of the templates. To use the templates in this case, parameter output subsystem 116 may perform the following operations. Parameter output subsystem 116 may retrieve, from the cryptographic token, a uniform resource identifier that includes a link to a plurality of templates (e.g., templates for different computing systems). Parameter output subsystem 116 may then retrieve, based on the uniform resource identifier, the template associated with the requesting computing platform. For example, each computing platform may have an associated identifier which may be received as part of the retrieval request. Thus, parameter output subsystem 116 may use the identifier to identify the template corresponding to the requesting platform. Parameter output subsystem 116 may then retrieve a template associated with the computing platform. In some embodiments, the URI may be a link to a database (e.g., on data node 104) that stores the templates. Thus, parameter output subsystem 116 may query the database using the platform identifier and receive the template as the response. Once the set of platform parameters is generated, parameter output subsystem 116 may transmit (e.g., using communication subsystem 112) the set of platform parameters to the computing platform.

In some embodiments, parameter output subsystem 116 may store object parameters outside the cryptographic token and may enable retrieving those parameters using a link (e.g., a URI) within the cryptographic token. This may be useful when there are many parameters for an object, and it would be difficult to store all those parameters within the cryptographic token. For example, parameter output subsystem 116 may retrieve (e.g., via communication subsystem 112), from the cryptographic token, a uniform resource identifier that includes a link to a plurality of object parameters. As discussed above, the link may be a link to a database server storing the parameters. Parameter output subsystem 116 may use a token identifier as part of a database query for retrieval of those object parameters. Thus, parameter output subsystem 116 may retrieve, based on the uniform resource identifier, the plurality of object parameters (e.g., using the URI or another link). Furthermore, as discussed above, the template may be stored with the same or different URI or link. Thus, parameter output subsystem 116 may retrieve a format (e.g., a template) associated with the computing platform, and format the plurality of object parameters into the set of platform parameters according to the format (e.g., according to a template).

As discussed above, a user may be able to use the same cryptographic token on multiple computing platforms. Thus, one of the advantages of using the cryptographic token is that blockchain data is readable by any computing platform and, because of that, any computing platform may use the cryptographic token. Thus, in some embodiments, object retrieval system 102 may receive, from a second computing platform, a second retrieval request. The second retrieval request may include a token identifier of the cryptographic token, an application identifier of the cryptography-based storage application, and a second cryptographic signature generated by the cryptography-based storage application. If the same user is requesting to use the same object as with the first platform, the token identifier and the application identifier may be the same. However, the cryptographic signature may be different as this would be a different transaction sent from a different computing system. Object retrieval system 102 may determine, using the second cryptographic signature and the token identifier, that the cryptography-based storage application controls the cryptographic token. Object retrieval system 102 may use the same operations as discussed above to make this determination.

Once the determination is made, object retrieval system 102 may generate a second set of platform parameters for the object unique to the second computing platform. The second set of platform parameters may be used by the second computing platform to render the object within the second computing platform. For example, object retrieval system 102 may retrieve a second format (e.g., a second template) corresponding to the second platform and use that template to build a response so that the object may be rendered.

Computing Environment

Figure 6:
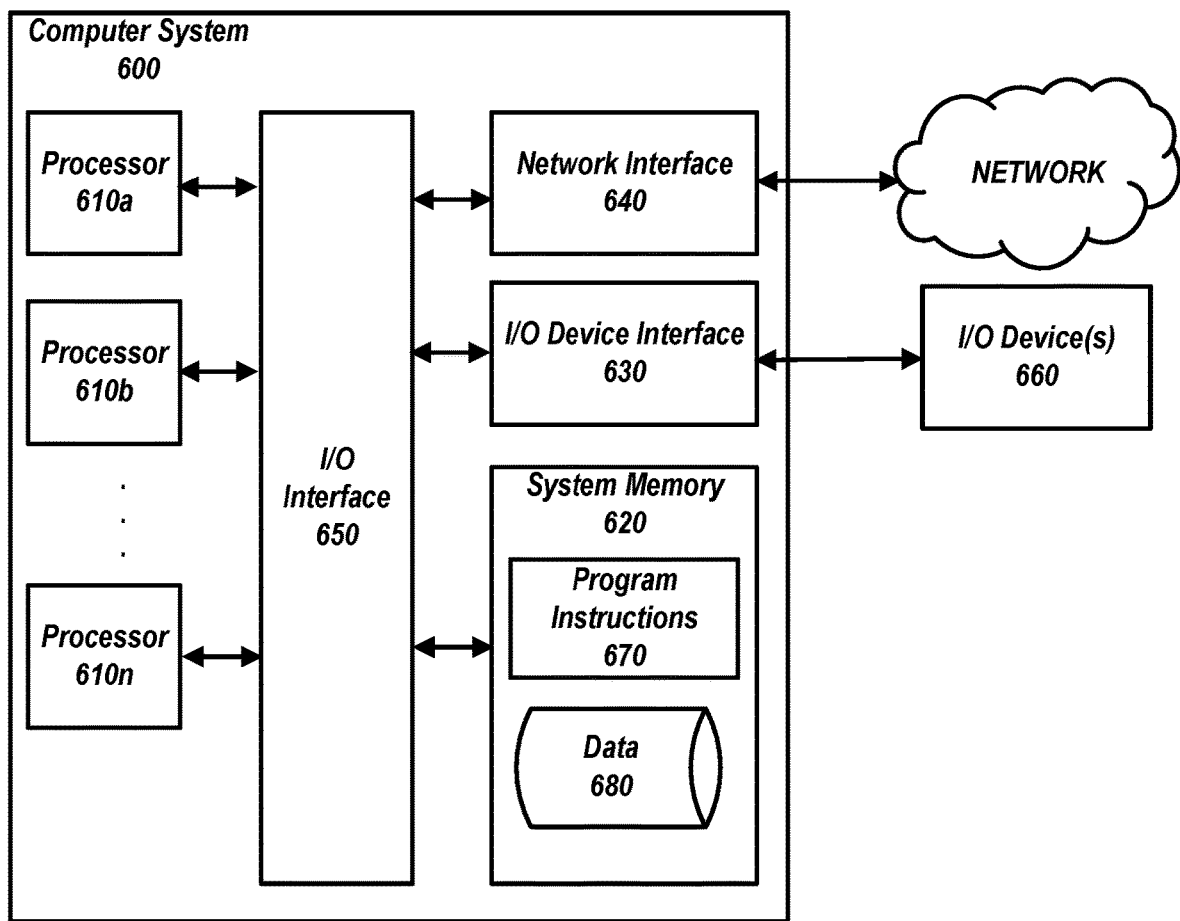
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
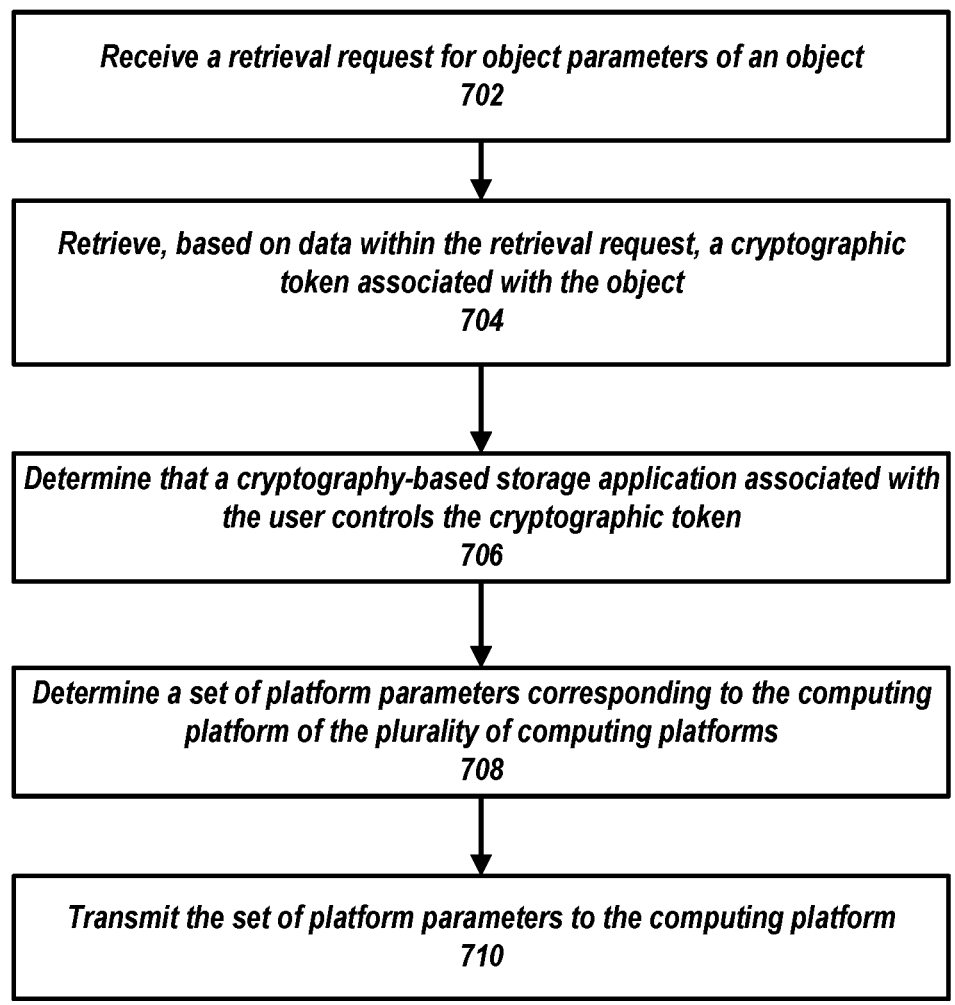
FIG. 7 is a flowchart of operations for using cryptographic tokens to use items on multiple computing platforms, in accordance with one or more embodiments of this disclosure.

FIG. 7 is a flowchart of operations 700 for using cryptographic tokens to render virtual representations of objects on different computing platforms. The operations of FIG. 7 may use components described in relation to FIG. 6. In some embodiments, object retrieval system 102 may include one or more components of computer system 600. At 702, object retrieval system 102 receives a retrieval request for object parameters of an object. For example, the object retrieval system 102 may receive the retrieval request from a computing platform of computing platforms 108a to 108n. Object retrieval system 102 may receive the retrieval request using network interface 640 over network 150.

At 704, object retrieval system 102 retrieves, based on data within the retrieval request, a cryptographic token associated with the object. For example, object retrieval system 102 may retrieve the cryptographic token from a blockchain using network interface 640 over network 150. Object retrieval system 102 may use one or more processors 610a, 610b, and/or 610n to process the received cryptographic token. At 706, object retrieval system 102 determines that a cryptography-based storage application associated with the user controls the cryptographic token. Object retrieval system 102 may use one or more processors 610a, 610b, and/or 610n to process the received cryptographic token.

At 708, object retrieval system 102 determines a set of platform parameters corresponding to the computing platform of the plurality of computing platforms. Object retrieval system 102 may use one or more processors 610a, 610b, and/or 610n to process the received cryptographic token. At 710, object retrieval system 102 transmits the set of platform parameters to the computing platform. For example, object retrieval system 102 may transmit the function using network interface 640 over network 150.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing parameter retrieval for multiple computing platforms, the method comprising: receiving, from a computing platform of a plurality of computing platforms, a retrieval request for object parameters of an object to be rendered for a user within the computing platform; retrieving, based on data within the retrieval request, a cryptographic token associated with the object; determining that a cryptography-based storage application associated with the user controls the cryptographic token; determining, based on token data within the cryptographic token, a set of platform parameters corresponding to the computing platform of the plurality of computing platforms, wherein the set of platform parameters is unique to the computing platform; and transmitting the set of platform parameters to the computing platform.
2. Any of the preceding embodiments, wherein the retrieval request comprises (1) a token identifier of the cryptographic token that encodes the object to be displayed within the computing platform (2) an application identifier of the cryptography-based storage application, and (3) a cryptographic signature generated by the cryptography-based storage application.
3. Any of the preceding embodiments, wherein determining that the cryptography-based storage application associated with the user controls the cryptographic token further comprises: determining that the application identifier matches a control identifier stored in association with the cryptographic token; verifying the cryptographic signature by successfully decrypting a payload within the cryptographic signature using a public key associated with the cryptography-based storage application; and based on successful match and successful verification, determining that the cryptography-based storage application controls the cryptographic token.
4. Any of the preceding embodiments, further comprising: receiving, from a second computing platform, a second retrieval request comprising (1) a token identifier of the cryptographic token, (2) an application identifier of the cryptography-based storage application, and (3) a second cryptographic signature generated by the cryptography-based storage application; determining, using the second cryptographic signature and the token identifier, that the cryptography-based storage application controls the cryptographic token; and generating a second set of platform parameters for the object unique to the second computing platform, wherein the second set of platform parameters is used by the second computing platform to render the object within the second computing platform.
5. Any of the preceding embodiments, wherein determining the set of platform parameters for the object further comprises: retrieving, using the cryptographic token, a plurality of encrypted object parameters associated with the object encoded by the cryptographic token; transmitting a command to a client device associated with the cryptography-based storage application to decrypt the plurality of encrypted object parameters; in response to the command, receiving the object parameters from the client device; and encoding the object parameters into the set of platform parameters for the computing platform.
6. Any of the proceeding embodiments, wherein encoding the object parameters into the set of platform parameters for the computing platform further comprises: retrieving a format template associated with the computing platform; and encoding the object parameters into the set of platform parameters according to the format template.
7. Any of the preceding embodiments, further comprising: receiving a token generation request to generate the cryptographic token, wherein the token generation request comprises a plurality of object parameters and an application identifier of the cryptography-based storage application; encrypting the plurality of object parameters using a public key associated with the cryptography-based storage application into an encrypted plurality of object parameters; and generating the cryptographic token to be controlled by the cryptography-based storage application, wherein the cryptographic token stores the encrypted plurality of object parameters.
8. Any of the preceding embodiments, wherein determining the set of platform parameters corresponding to the computing platform comprises: retrieving, from the cryptographic token, a uniform resource identifier comprising a link to a plurality of object parameters; retrieving, based on the uniform resource identifier, the plurality of object parameters; retrieving a format associated with the computing platform; and formatting the plurality of object parameters into the set of platform parameters according to the format.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.
12. A system comprising cloud-based circuitry for performing any of embodiments 1-8.

What is claimed is:

1. A system for providing parameter retrieval for multiple computing platforms, the system comprising:
one or more processors; and
a non-transitory computer-readable storage medium storing instructions, which when executed by the one or more processors cause the one or more processors to perform operations comprising:

receiving, from a first computing platform, a first retrieval request comprising (1) a token identifier of a cryptographic token for an object to be displayed within each of a plurality of computing platforms, (2) an application identifier of a cryptography-based storage application, and (3) a first cryptographic signature generated by the cryptography-based storage application;

retrieving, from the cryptographic token based on the token identifier, a uniform resource identifier comprising a link to a database that stores respective object parameters and respective format templates for the plurality of computing platforms;

retrieving, from the database based on the uniform resource identifier, a first plurality of object parameters and a first format template associated with the first computing platform;

encoding the first plurality of object parameters into a first set of platform parameters according to the first format template, wherein the first set of platform parameters is unique to the first computing platform, and wherein the first set of platform parameters is used by the first computing platform to render the object on the first computing platform;

receiving, from a second computing platform, a second retrieval request comprising (1) the token identifier, (2) the application identifier, and (3) a second cryptographic signature generated by the cryptography-based storage application;

retrieving, from the cryptographic token based on the token identifier, the uniform resource identifier;

retrieving, from the database based on the uniform resource identifier, a second plurality of object parameters and a second format template associated with the second computing platform;

encoding the second plurality of object parameters into a second set of platform parameters according to the second format template, wherein the second set of platform parameters is unique to the second computing platform, and wherein the second set of platform parameters is used by the second computing platform to render the object on the second computing platform; and transmitting the first set of platform parameters to the first computing platform and the second set of platform parameters to the second computing platform.

2. The system of claim 1, wherein the instructions for retrieving the first plurality of object parameters cause the one or more processors to perform operations comprising:

retrieving a plurality of encrypted object parameters encoded by the cryptographic token;

transmitting a command to a client device associated with the cryptography-based storage application to decrypt the plurality of encrypted object parameters; and in response to the command, receiving the first plurality of object parameters from the client device.

3. The system of claim 1, wherein the instructions further cause the one or more processors to perform operations comprising:

receiving a token generation request to generate the cryptographic token, wherein the token generation request comprises a plurality of object parameters and the application identifier of the cryptography-based storage application;

encrypting the plurality of object parameters using a public key associated with the cryptography-based storage application into an encrypted plurality of object parameters; and generating the cryptographic token to be controlled by the cryptography-based storage application.

4. The system of claim 1, wherein the instructions further cause the one or more processors to perform operations comprising:

determining, using the first cryptographic signature and the token identifier, that the cryptography-based storage application controls the cryptographic token.

5. The system of claim 4, wherein the instructions for determining that the cryptography-based storage application controls the cryptographic token cause the one or more processors to perform operations comprising:

determining that the application identifier matches a control identifier stored in association with the cryptographic token;

verifying the first cryptographic signature by successfully decrypting a payload within the first cryptographic signature using a public key associated with the cryptography-based storage application; and based on successful match and successful verification, determining that the cryptography-based storage application controls the cryptographic token.

6. The system of claim 4, wherein the instructions further cause the one or more processors to perform operations comprising:

determining, using the second cryptographic signature and the token identifier, that the cryptography-based storage application controls the cryptographic token.

7. A method for providing parameter retrieval for multiple computing platforms, the method comprising:

receiving, from a computing platform of a plurality of computing platforms, a retrieval request for object parameters of an object to be rendered for a user within the computing platform;

retrieving, based on data within the retrieval request, a cryptographic token associated with the object;

retrieving, from the cryptographic token, a uniform resource identifier comprising a link to a database that stores respective object parameters and respective format templates for the plurality of computing platforms;

retrieving, from the database based on the uniform resource identifier, the object parameters and a format template associated with the computing platform;

encoding the object parameters into a set of platform parameters according to the format template; and transmitting the set of platform parameters to the computing platform.

8. The method of claim 7, wherein the retrieval request comprises (1) a token identifier of the cryptographic token that encodes the object to be displayed within the computing platform, (2) an application identifier of a cryptography-based storage application, and (3) a cryptographic signature generated by the cryptography-based storage application.

9. The method of claim 8, further comprising:

determining that the application identifier matches a control identifier stored in association with the cryptographic token;

verifying the cryptographic signature by successfully decrypting a payload within the cryptographic signature using a public key associated with the cryptography-based storage application; and based on successful match and successful verification, determining that the cryptography-based storage application controls the cryptographic token.

10. The method of claim 7, further comprising:
receiving, from a second computing platform, a second retrieval request comprising (1) a token identifier of the cryptographic token, (2) an application identifier of a cryptography-based storage application, and (3) a second cryptographic signature generated by the cryptography-based storage application;
determining, using the second cryptographic signature and the token identifier, that the cryptography-based storage application controls the cryptographic token; and
generating a second set of platform parameters for the object unique to the second computing platform, wherein the second set of platform parameters is used by the second computing platform to render the object within the second computing platform.

11. The method of claim 7, wherein retrieving the object parameters comprises:
retrieving a plurality of encrypted object parameters encoded by the cryptographic token;
transmitting a command to a client device associated with a cryptography-based storage application to decrypt the plurality of encrypted object parameters; and
in response to the command, receiving the object parameters from the client device.

12. The method of claim 7, further comprising:
receiving a token generation request to generate the cryptographic token, wherein the token generation request comprises a plurality of object parameters and an application identifier of a cryptography-based storage application;
encrypting the plurality of object parameters using a public key associated with the cryptography-based storage application into an encrypted plurality of object parameters; and
generating the cryptographic token to be controlled by the cryptography-based storage application.

13. The method of claim 7, further comprising:
determining that a cryptography-based storage application associated with the user controls the cryptographic token.

14. The method of claim 7, wherein the set of platform parameters is unique to the computing platform.

15. A non-transitory, computer-readable medium storing instructions that when executed by one or more processors cause the one or more processors to perform operations comprising:
receiving, from a computing platform of a plurality of computing platforms, a retrieval request for object parameters of an object to be rendered for a user within the computing platform;
retrieving, based on data within the retrieval request, a cryptographic token associated with the object;
determining that a cryptography-based storage application associated with the user controls the cryptographic token;
retrieving, from the cryptographic token, a uniform resource identifier comprising a link to a database;
retrieving, from the database based on the uniform resource identifier, the object parameters and a format template associated with the computing platform;
encoding the object parameters into a set of platform parameters according to the format template; and
transmitting the set of platform parameters to the computing platform.

16. The non-transitory, computer-readable medium of claim 15, wherein the retrieval request comprises (1) a token identifier of the cryptographic token that encodes the object to be displayed within the computing platform (2) an application identifier of the cryptography-based storage application, and (3) a cryptographic signature generated by the cryptography-based storage application.

17. The non-transitory, computer-readable medium of claim 16, wherein the instructions for determining that the cryptography-based storage application associated with the user controls the cryptographic token, further cause the one or more processors to perform operations comprising:
determining that the application identifier matches a control identifier stored in association with the cryptographic token;
verifying the cryptographic signature by successfully decrypting a payload within the cryptographic signature using a public key associated with the cryptography-based storage application; and
based on successful match and successful verification, determining that the cryptography-based storage application controls the cryptographic token.

18. The non-transitory, computer-readable medium of claim 15, wherein the instructions further cause the one or more processors to perform operations comprising:
receiving, from a second computing platform, a second retrieval request comprising (1) a token identifier of the cryptographic token, (2) an application identifier of the cryptography-based storage application, and (3) a second cryptographic signature generated by the cryptography-based storage application;
determining, using the second cryptographic signature and the token identifier, that the cryptography-based storage application controls the cryptographic token; and
generating a second set of platform parameters for the object unique to the second computing platform, wherein the second set of platform parameters is used by the second computing platform to render the object within the second computing platform.

19. The non-transitory, computer-readable medium of claim 15, wherein the instructions for retrieving the object parameters further cause the one or more processors to perform operations comprising:
retrieving a plurality of encrypted object parameters encoded by the cryptographic token;
transmitting a command to a client device associated with the cryptography-based storage application to decrypt the plurality of encrypted object parameters; and
in response to the command, receiving the object parameters from the client device.

20. The non-transitory, computer-readable medium of claim 15, wherein the instructions further cause the one or more processors to perform operations comprising:
receiving a token generation request to generate the cryptographic token, wherein the token generation request comprises a plurality of object parameters and an application identifier of the cryptography-based storage application;
encrypting the plurality of object parameters using a public key associated with the cryptography-based storage application into an encrypted plurality of object parameters; and generating the cryptographic token to be controlled by the cryptography-based storage application.

\* \* \* \* \*